United States Patent

Sasaya

[11] 4,352,547
[45] Oct. 5, 1982

[54] FOCUSING SCREEN OF A CAMERA
[75] Inventor: Toshihiro Sasaya, Kawasaki, Japan
[73] Assignee: Nippon Kogaku K.K., Tokyo, Japan
[21] Appl. No.: 285,132
[22] Filed: Jul. 14, 1981
[51] Int. Cl.³ .......................................... G03B 13/20
[52] U.S. Cl. .................................................. 354/200
[58] Field of Search ............... 350/128, 129; 354/152, 354/155, 219, 224, 225, 200, 201

[56] References Cited
U.S. PATENT DOCUMENTS 3,003,387 10/1961 Schiele .......................... 354/155 X
3,498,198 3/1970 Fujii ............................... 354/155 X
4,003,637 1/1977 Masuoka ......................... 354/200 X
4,071,292 1/1978 Ise et al. .......................... 350/128

FOREIGN PATENT DOCUMENTS 55-50228 4/1980 Japan .................................. 354/200
924757 5/1963 United Kingdom ............... 354/200

Primary Examiner—Donald A. Griffin
Attorney, Agent, or Firm—Fitzpatrick, Cella, Harper & Scinto

[57] ABSTRACT

In a focusing screen capable of passing light therethrough and disposed between an objective lens and an eyepiece to enable the focused condition of the objective lens with respect to an object to be observed through the eyepiece and having a surface formed with a number of pyramidical faces, the angle of inclination $\alpha$ of each of said pyramids satisfies an inequality that $$\frac{0.8f}{10,000(n-1)\Delta} \leq \alpha \leq \frac{1.5}{2(n-1)F}$$

where F represents the F-number of the optical system from the objective lens to the focusing screen, f the focal length of the eyepiece, n the refractive index of the focusing screen and $\Delta$ the required range finding accuracy, and the focusing screen satisfies $$A < \frac{3}{10,000}$$

where A represents the visual angle whereat a length cos $\alpha$ times as great as the length of the slant face extending from the bottom surface to the vertex of the pyramid at the angle of inclination $\alpha$ is seen through said eyepiece.

9 Claims, 5 Drawing Figures

FOCUSING SCREEN OF A CAMERA

BACKGROUND OF THE INVENTION

1. Field of the Invention

This invention relates to a focusing screen used in the finder of a still camera or a movie camera.

2. Description of the Prior Art

Conventional focusing screens for cameras are of the mat surface type, the microprism type or the split image type. Of these, the split image type has involved the necessity of properly making adjustment of the visibility of the eyepiece to properly effect focusing because, in case of an aerial image, the eye adjusts the focus even if the focus point of the lens is not coincident with the focal plane. Also, sufficient range finding accuracy has not been obtained unless a target perpendicular to the optical wedge has lain at the location whereat the split exists. The mat surface type has involved the necessity of improving the diffusion property of the mat surface in order to obtain sufficient range finding accuracy on the mat surface, but if the diffusion property is improved, the particulate character of the mat surface becomes conspicuous and the finder view field becomes remarkably dark to make focusing difficult to effect. The microprism type, when disposed on the entire focusing screen, can be adjusted anywhere with sufficient range finding accuracy, but the image at a location whereat the focus point is not adjusted has been unsightly and difficult to see. That is, in the conventional microprism type focusing screen, the pitch of the microprism is great as compared with the resolution of the eye and therefore, defocused image can be handled in the fashion of vernier visual power to provide considerably good range finding accuracy, but defocused image (out-of focus image) has been unsightly. To make this defocused image easier to observe, the pitch of the microprism can be made small, but if it is made too small, the feature that the defocused image becomes rugged will be lost to reduce the range finding accuracy.

SUMMARY OF THE INVENTION

It is an object of the present invention to provide a focusing screen which readily permits the focus point to be adjusted at whatever position in the finder view field the object to be photographed lies and which enables sufficient range finding accuracy to be obtained.

The invention will become fully apparent from the following detailed description of some embodiments thereof taken in conjunction with the accompanying drawings.

DESCRIPTION OF THE PREFERRED EMBODIMENTS

Figure 1:
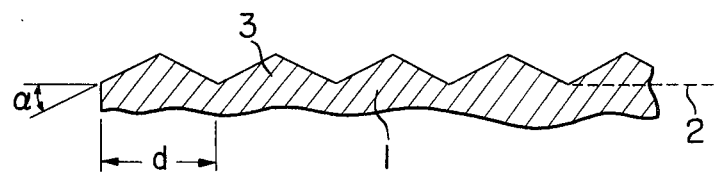
FIG. 1 is a front cross-sectional view of an embodiment of the present invention.
Figure 2:
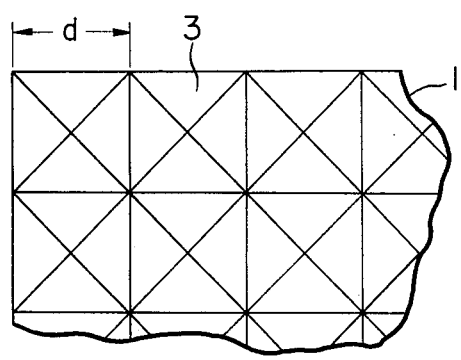
FIG. 2 is a plan view thereof.

FIG. 1 is a fragmentary cross-sectional view for illustrating the present invention. A focusing screen 1 is such that quadrangular pyramids 3 whose bottom surface provides a focal plane 2 (the quadrangular pyramids may be replaced by triangular pyramids or cones as will hereinafter be described, but herein quadrangular pyramids are typically used) are laid over a plane with the bases thereof in contact with one another. The angle $\alpha$ indicates the angle of inclination of the slant face of the quadrangular pyramid 3 on the focal plane, and the length d indicates the length of one side of bottom surface of the quadrangular pyramid 3. FIG. 2 shows the focusing screen as viewed from the front thereof. The underside (not shown) of the focusing screen 1 is planar, spherical, non-spherical or Fresnel-like.

When the amount of perceptible out-of-focus is discussed by using the resolution of out-of-focus with respect to a mat type focusing screen there are the following two cases depending on the F-number (F) of the finder system and the angle ($\phi$) to the perceptible diffused light ray with the plain component of the mat surface. It is to be understood here that F-number of the finder system is the F-number of the optical system from the objective lens to the focusing screen.

$$\text{(i)} \quad F \leq \frac{1}{2\phi} \tag{1-1}$$

$$\text{(ii)} \quad F > \frac{1}{2\phi} \tag{2-1}$$

In the respective cases, let $\Delta_1$ and $\Delta_2$ be the amounts of perceptible out-of-focus, n be the refractive index of the focusing screen 1, $\epsilon$ be the minimum identifiable resolution of out-of-focus, k be the correction coefficient, and f be the focal length of the eyepiece. Then, in the case of formula (1-1), $$\Delta_1 = \frac{f \cdot \epsilon \cdot k}{2\phi} \tag{1-2}$$

and in the case of formula (2-1), $$\Delta_2 = F \cdot f \cdot \epsilon \cdot k \tag{2-2}$$

Now, in the case of the focusing screen 1 comprising the quadrangular pyramids 3 having the angle of inclination $\alpha$ and spread all over as shown in FIG. 1, the angle $\phi$ is equal to $n-1)\alpha$. Consequently, if this relation is substituted into formulae (1-1) and (2-1), $$F \leq \frac{1}{2(n-1)\alpha} \tag{1-3}$$

$$F > \frac{1}{2(n-1)\alpha} \tag{2-3}$$

and cases (i) and (ii) can be discussed with the aid of the angle of inclination $\alpha$ of the quadrangular pyramid and the refractive index n of the focusing screen. Here, in the focusing screen 1 shown in FIG. 1, the amount of perceptible out-of-focus $\Delta_1'$ in case (i) is given by formula (1-2):

$$\Delta_1' = \frac{f \cdot \epsilon \cdot k}{2(n-1)\alpha} \tag{1-4}$$

Also, since the term of the angle $\phi$ is absent in formula (2-2), the amount of perceptible out-of-focus $\Delta_2'$ in case (ii) is $$\Delta_2' = \Delta_2 \quad (2\text{-}4)$$

Figure 3:
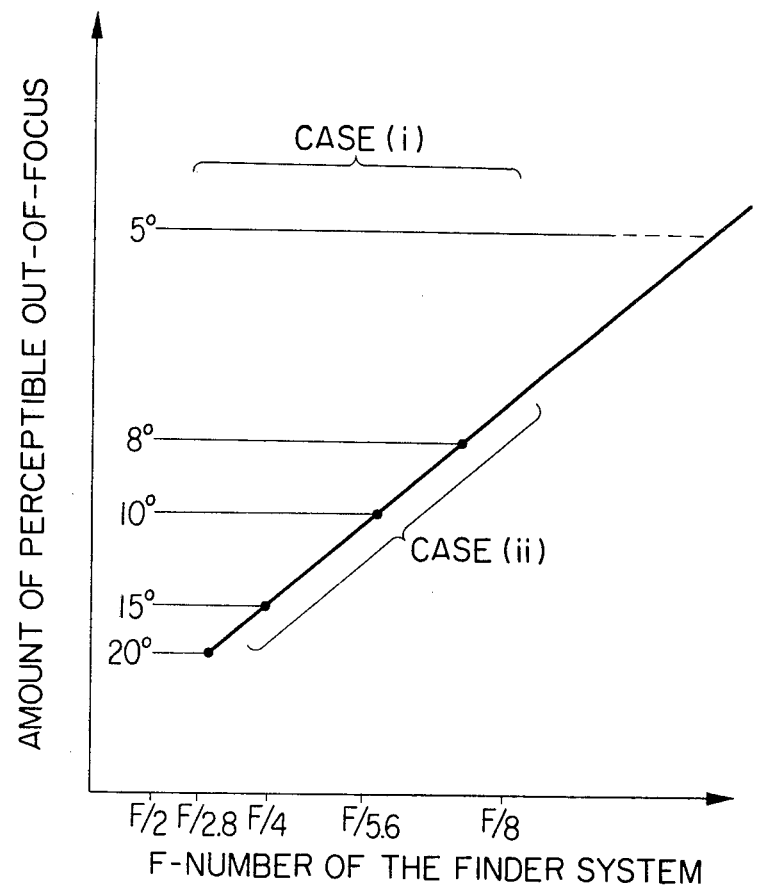
FIG. 3 is a graph illustrating the relation between the F-number of the finder system and the amount of perceptible out-of-focus.

FIG. 3 illustrates the relation among the amounts of perceptible out-of-focus $\Delta_1$, $\Delta_2$ described with respect to cases (i) and (ii), respectively, F-number of finder system and the angle of inclination $\alpha$ of the quadrangular pyramid. For example, in the case of a focusing screen comprising quadrangular pyramids of $\alpha = 15°$ spread all over, the amount of perceptible out-of-focus does not vary for the F-number of the finder system ranging from F/2 to F/4

$$\left(\text{the case of } F \leq \frac{1}{2(n-1)\alpha}\right),$$

and if the F-number of the finder system becomes darker than F/4, the amount of perceptible out-of-focus will increase with an increase in F-number $$\left(\text{the case of } F > \frac{1}{2(n-1)\alpha}\right).$$

That is, once the angle of inclination $\alpha$ is determined, in case (i), the amount of perceptible out-of-focus depends on the angle of inclination $\alpha$ and not on F-number, while, in case (ii), it does not depend on the angle of inclination $\alpha$ and not on F-number, while, in case (ii), it does not depend on the angle of inclination $\alpha$ but only on F-number. This means that the area of each angle of inclination which is parallel to the abscissa of FIG. 3 is an area in which the range finding accuracy is not improved even if F-number is varied and that respective oblique areas are those in which the range finding accuracy is reduced if F-number is increased.

That is, for the same angle of inclination, the same range finding accuracy is provided in the area of $$F \leq \frac{1}{2(n-1)\alpha}$$

of formula (1-3), but the range finding accuracy is aggravated in the area of $$F > \frac{1}{2(n-1)\alpha}$$

of formula (2-3), and the same range finding accuracy can be secured in the area of formula (1-3) at a lower angle of inclination. From the fact that the angle of inclination $\alpha$ is an amount related to the brightness of the finder view field and should desirably be small, $$F \leq \frac{1}{2(n-1)\alpha}$$

of formula (1-3) becomes the condition. That is, $$\alpha \leq \frac{1}{2(n-1)F}$$

becomes the condition. Actually, the angle of inclination may be of the order of $$\alpha \leq \frac{1.5}{2(n-1)F} \quad (1\text{-}5)$$

Also, the range finding accuracy at this time must be involved in necessary accuracies. That is, from formula (1-4), the necessary range finding accuracy $\Delta$ may be $$\Delta \geq \frac{f \cdot \epsilon \cdot k}{2(n-1)\alpha} \quad (3)$$

Generally, 4/10,000 is adopted as the minimum identifiable resolution of out-of-focus. Also, where dynamic out-of-focus, namely, the amount of variation of out-of-focus, is to be detected, if a minimum of 0.4 is taken into account as the correction coefficient k, formula (3) will become $$\Delta \geq \frac{0.8f}{10000(n-1)\alpha} \quad (4)$$

That is, $\alpha$ may be $$\alpha \geq \frac{0.8f}{10000(n-1)\Delta} \quad (5)$$

That is, when use is made of a focusing screen which satisfies formulae (1-5) and (5), there is obtained a finder system which is bright and which has a sufficient range finding accuracy.

At this time, if, for the angle of inclination $\alpha$, design is made to satisfy $$\sin\alpha \sqrt{4F^2 n^2 - 1} + \cos\alpha < 2F, \quad (6)$$

the object light can be prevented from being totally reflected in the focusing screen.

At this time, it is to be understood that as regards a quadrangular pyramid whose base (or bottom surface) has a length d, the visual angle d/2f whereat a length cos $\alpha$ times as great as the length of the slant face extending from the bottom surface to the vertex of the quadrangular pyramid at an angle of inclination $\alpha$, namely, d/2, is seen through an eyepiece having a focal length f is less than three times the vernier visual power 1/10,000 of the eye. That is, $$\frac{d}{2f} < \frac{3}{10000} \quad (1\text{-}6)$$

This means that focusing depends only on detection of out-of-focus and that particulate character is inconspicuous.

On the other hand, as seen from FIG. 3, it is sometimes the case that for the designated F-number of the finder system, there is not obtained a necessary amount of detected out-of-focus or, for example, there is not obtained a necessary angle of inclination of the quadrangular pyramid by reason of the brightness or the like of the finder system. In those cases, the detection accuracy can be increased by selecting the visual angle of said length d/2 of each quadrangular pyramid within $$\frac{3}{10000} \leq \frac{d}{2f} < \frac{8}{10000} \quad (7)$$

These areas are those in which the ruggedness appearing in the defocused image of the microprism can be utilized during range finding without so much deteriorating the particulate character. That is, these areas are considered to be ones intermediate the mat and the microprism and in which out-of-focus is detected for great defocus and the ruggedness is utilized for fine adjustment. Formula (7) is also established in a case where the pyramid is replaced by a cone having the diameter d of its bottom surface. This is because the length cos α times as great as the slant face extending from the bottom surface to the vertex of the cone at an angle of inclination α is d/2. In the case of a triangular pyramid, it will be apparent that the length cos α times as great varies in accordance with the shape of the bottom surface thereof.

The maximum focus point detecting capability at this time is considered to be of the same degree as the microprism, and if 1/10,000 of the vernier visual power is adopted as the minimum identifiable resolution of out-of-focus in formula (1-4) and the correction coefficient k is a minimum 0.4 assuming that dynamic focusing is effected, $$\Delta \leq \frac{0.2f}{10,000(n-1)\alpha} \quad (8)$$

That is, the angle of inclination α of the quadrangular pyramid may be $$\alpha \geq \frac{0.2f}{10,000(n-1)\Delta} \quad (9)$$

$$\left( \text{But } \alpha \leq \frac{1.5}{2(n-1)F} \right)$$

Figure 4:
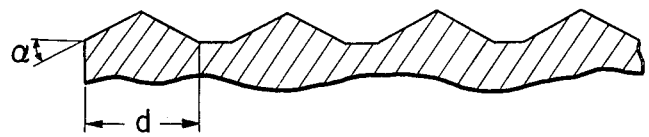
FIGS. 4 and 5 are front cross-sectional views showing further embodiments of the present invention.
Figure 5:
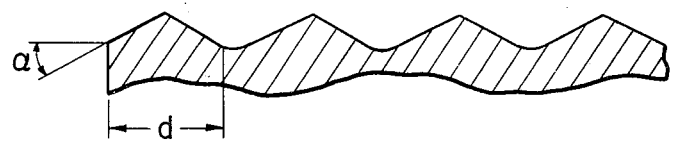

When a focusing screen comprising quadrangular pyramids regularly arranged as shown in FIG. 1 is utilized for a television camera finder, the bases of each quadrangular pyramid look like the scanning lines of television and the ruggedness during defocus effectively corresponds to the emphasized edge during electronic finder focusing.

Where the quantity of light to the eyepiece is deficient, It can be increased by making a transparent plain portion between adjacent mountains as shown in FIG. 4 or by forming the portion between adjacent mountains into a spherical shape as shown in FIG. 5, and this is more effective.

Further, the range finding accuracy can be increased by providing minute concave-convexity on and between the mountains of the focusing screen. Particularly, where the exit pupil of the light beam incident on the focusing screen is very near or in the case of a single lens reflex camera finder wherein the exit pupil position is variable by the objective lens, the range finding accuracy varies with the image height. Again in these cases, the range finding accuracy can effectively be maintained by providing minute irregularities and increasing the diffusion property.

Specific data will be shown below.

(1) When, in a 35 mm single lens reflex camera finder, range finding is possible up to F/1.2 and the F-number of the finder system is F/1.2 and the focal length f of the eyepiece is f=60 mm and the refractive index n of the focusing screen is n=1.49, (a) $14.0° \leq \alpha \leq 25.9°$
   $d < 0.036$ mm
(b) $3.5° \leq \alpha \leq 25.9°$
   $0.036 \leq d \leq 0.096$ mm (2) When, in a ⅔ inch television camera finder, range finding is possible up to F/1.6 and the F-number of the finder system is F/4 and the focal length f of the eyepiece lens is f=20 mm and the refractive index n of the focusing screen is n=1.49, (a) $3.1° \leq \alpha \leq 17.6°$
   $d < 0.012$ mm
(b) $0.8° \leq \alpha \leq 17.6°$
   $0.012 \leq d \leq 0.032$ mm In the foregoing, (a) is the data when (d/2f)<(3/10,000) and formulae (1-5) and (5) are satisfied, and (b) is the data when formulae (7) and (9) are satisfied.

I claim:

1. In a focusing screen capable of passing light therethrough and disposed between an objective lens and an eyepiece to enable the focused condition of the objective lens with respect to an object to be observed through the eyepiece and having a surface formed with a number of pyramidical faces, the improvement residing in that the angle of inclination α of each of said pyramids satisfies an inequality that $$\frac{0.8f}{10,000(n-1)\Delta} \leq \alpha \leq \frac{1.5}{2(n-1)F}$$

where F represents the F-number of the optical system from the objective lens to the focusing screen, f the focal length of the eyepiece, n the refractive index of the focusing screen and Δ the required range finding accuracy, and the focusing screen satisfies $$A < \frac{3}{10,000}$$

where A represents the visual angle whereat a length cos α times as great as the length of the slant face extending from the bottom surface to the vertex of said pyramid at the angle of inclination α is seen through said eyepiece.

2. In a focusing screen capable of passing light therethrough and disposed between an objective lens and an eyepiece to enable the focused condition of the objective lens with respect to an object to be observed through the eyepiece and having a surface formed with a number of pyramidical faces, the improvement residing in that the angle of inclination α of each of said pyramids satisfies an equality that $$\frac{0.2f}{10,000(n-1)\Delta} \leq \alpha \leq \frac{1.5}{2(n-1)F}$$

where F represents the F-number of the optical system from the objective lens to the focusing screen f the focal length of the eyepiece, n the refractive index of the focusing screen, and Δ the required range finding accuracy, and the focusing screen satisfies $$\frac{3}{10,000} \leq A \leq \frac{8}{10,000}$$

where A represents the visual angle whereat a length cos α times as great as the length of the slant face extending from the bottom surface to the vertex of said pyramid at the angle of inclination α is seen through said eyepiece.

3. The improvement recited in claim 1 or 2, wherein said pyramid satisfies $$\sin\alpha \sqrt{4F^2n^2 - 1} + \cos\alpha < 2F.$$

4. The improvement recited in claim 1 or 2, wherein when the length cos α times as great as the length of the slant face extending from the bottom surface to the vertex of said pyramid is d/2, said visual angle A satisfies $$A = \frac{d}{2f}.$$

5. The improvement recited in claim 4, wherein said pyramid is formed into the shape of a quadrangular pyramid in which the length of one side of the bottom surface is d.

6. The improvement recited in claim 4, wherein said pyramid is formed into the shape of a cone in which the diameter of the bottom surface is d.

7. The improvement recited in claim 4, wherein said pyramids are disposed at predetermined intervals on the surface of said focusing screen, and the surface of said focusing screen between said pyramids is formed by a planar surface.

8. The improvement recited in claim 4, wherein said pyramids are disposed at predetermined intervals on the surface of said focusing screen, and the surface of said focusing screen between said pyramids is formed by a spherical surface.

9. The improvement recited in claim 4, wherein said pyramids are disposed at predetermined intervals on the surface of said focusing screen, and the surface of said pyramids and the surface of said focusing screen between said pyramids are formed with minute irregularities.

* * * * *

UNITED STATES PATENT AND TRADEMARK OFFICE
CERTIFICATE OF CORRECTION

PATENT NO. : 4,352,547
DATED : October 5, 1982
INVENTOR(S) : TOSHIHIRO SASAYA

It is certified that error appears in the above—identified patent and that said Letters Patent is hereby corrected as shown below:

ON THE TITLE PAGE, between item [22] and [51], insert --[30] Foreign Application Priority Data
July 31, 1980 [JP] Japan....... 55/104276 --.
Column 2, line 63, "$\Delta'_1$" should be --$\Delta_1'$--

Signed and Sealed this

Fifteenth Day of February 1983

[SEAL]

Attest:

GERALD J. MOSSINGHOFF

Attesting Officer

Commissioner of Patents and Trademarks